Jan. 21, 1958   J. E. CRAWFORD   2,820,601
MOVABLE WING TIP

Filed March 9, 1953   2 Sheets-Sheet 1

INVENTOR
James E. Crawford

By Herbert E. Metcalf
His Patent Attorney

Jan. 21, 1958 J. E. CRAWFORD 2,820,601
MOVABLE WING TIP
Filed March 9, 1953 2 Sheets-Sheet 2
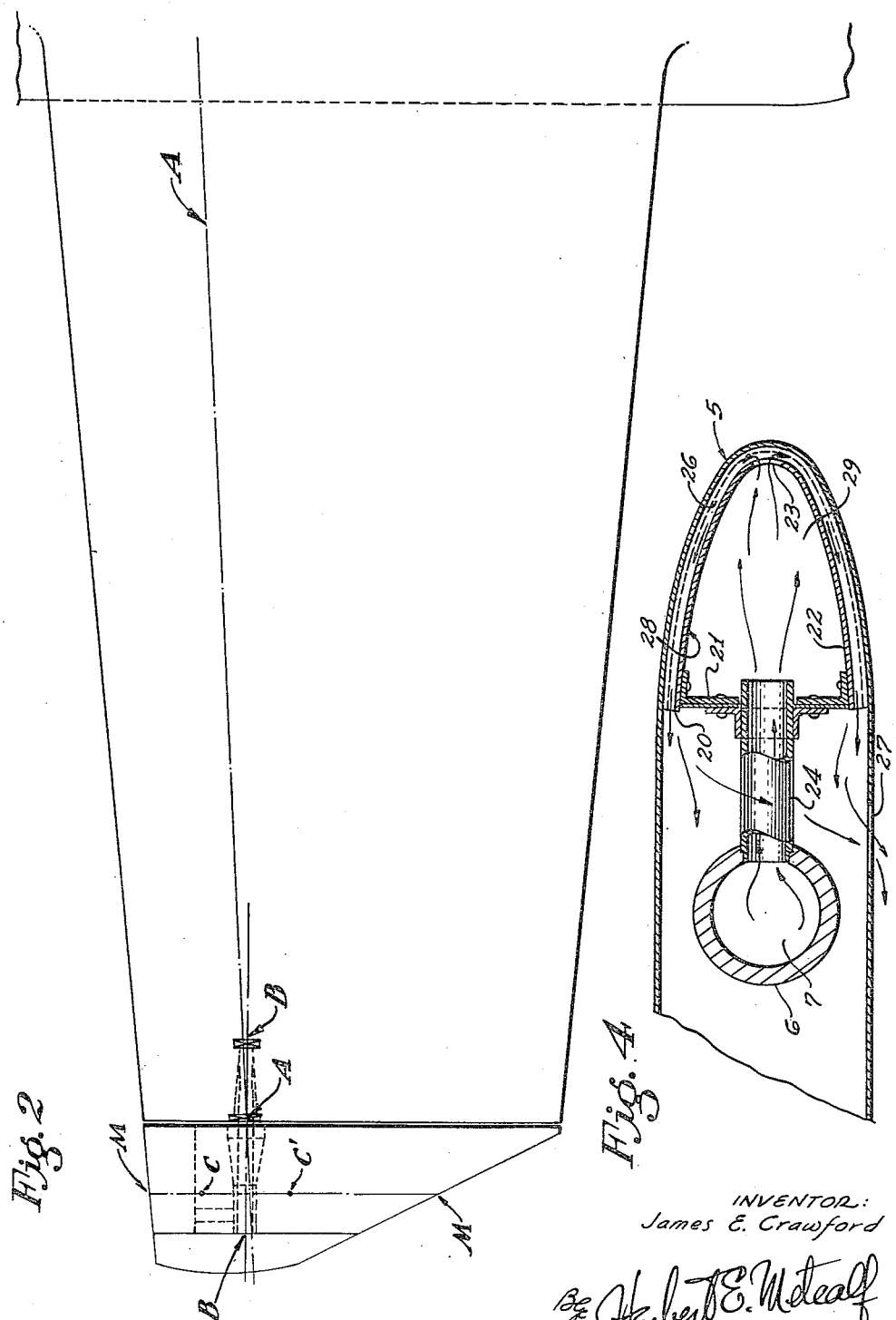
INVENTOR:
James E. Crawford
By Herbert E. Medcalf
His Patent Attorney

United States Patent Office 2,820,601
Patented Jan. 21, 1958

2,820,601

MOVABLE WING TIP

James E. Crawford, Los Angeles, Calif., assignor to Northrop Aircraft, Inc., Hawthorne, Calif., a corporation of California Application March 9, 1953, Serial No. 341,217

7 Claims. (Cl. 244—90)

This invention relates to airplane control surfaces and more particularly to rotatable wing tips, their specific design, and their relation to an airplane wing with which they are associated.

An airplane intended to fly at speeds slightly less than the speed of sound and also at supersonic speeds presents structural design problems which are not encountered at relatively slow speeds. Even at relatively slow speeds conventional lateral control surfaces, i. e., trailing edge ailerons, result in forces which may induce considerable torsional deflection in a wing with which such ailerons are associated. At supersonic speeds the torsional deflection of an airplane wing, utilizing trailing edge ailerons, is considerably increased over that of a plane traveling at slower speeds, for example in a 300–400 M. P. H. range. This increased torsional deflection is occasioned by the aerodynamic center of pressure shifting materially toward the trailing edge of the wing at supersonic speeds, thus the moment arm of the resultant airforce is increased with respect to the wing's elastic axis and an increased torsional deflection of the wing results. Such deflection of the wing may result in aileron reversal or an unloading of the wing i. e., a positive aileron setting may result in a negative rolling action in a manner that is well known in aeronautical fields.

Accordingly it is an object of this invention to provide a wing tip rotatably attached to an airplane wing which is alternately subject to subsonic and supersonic speeds. The wing tip being so designed and positioned with respect to its associated wing that the maximum torsional deflection of the wing will be limited to a minimum as a result of aerodynamic forces acting on the wing tip at subsonic or supersonic speeds.

Another object of this invention is to provide a wing tip rotatably attached to an airplane wing by means of a supporting shaft, the wing tip being alternately subject to subsonic and supersonic speeds. The wing tip being so designed and positioned with respect to its supporting shaft that the maximum torsional stress induced in the shaft will be limited to a minimum as a result of aerodynamic forces acting on the wing tip at subsonic or supersonic speeds.

Another object is to provide novel structure for conducting hot de-icing gas to the leading edge surface of a rotatable wing tip.

Briefly the objects of the present invention are attained by mounting a rotatable wing tip at the outer end of an airplane wing. Actual and wind tunnel tests show that for a given airfoil the aerodynamic center of pressure shifts toward the trailing edge as the airfoil is sequentially subjected to subsonic and then supersonic speeds. To limit the maximum torsional deflection of a wing to a minimum, the moment of the resultant airforce acting on the wing tip must be limited to a minimum, with respect to the wing's elastic axis, as the wing tip is alternately subject to subsonic and supersonic speeds. This is accomplished by designing the wing tip so its aerodynamic centers of pressure are located on opposite sides of the extended elastic axis of the wing as the wing tip is alternately subjected to subsonic and supersonic speeds. The wing tip is further designed so the moment of the resultant air force acting thereon is substantially numerically equal but opposite in reaction, with respects the wing's elastic axis, as the wing tip is subject to either subsonic or supersonic speeds.

Likewise if the maximum torsional stress induced in the wing tip's supporting shaft is to be limited to a minimum it must be located intermediate the wing tip's subsonic and supersonic centers of pressure. The supporting shaft must also be positioned so the moment of the resultant airforce, with respect to the axis of the supporting shaft, is substantially equal but opposite in reaction as the wing tip is subject to either subsonic or supersonic speeds. To limit both the maximum torsional deflection of the wing and torsional stress in the wing tip's supporting shaft to a minimum the elastic axis of the wing and the axis of the shaft are located on a common axis. As disclosed in one embodiment of the present invention this common axis is the wing's elastic axis and the extension thereof. If the wing's elastic axis, the wing tip's supporting shaft, and the wing tip's subsonic and supersonic centers of pressure do not bear the above relation either the maximum torsional deflection of the wing or maximum torsional stress induced in the wing tip's supporting shaft will necessarily be greater at subsonic or at supersonic speeds. This will become more apparent as the disclosure progresses.

Throughout this specification and appended claims the term "elastic axis" as applied to an airplane wing will be understood to refer to a line located at approximately 25% of the chord from the wing's leading edge, a load may be applied along this line without inducing torsional deflection or torsional stress in the wing.

A better understanding of the invention will become apparent from the following description and reference to the accompanying drawings. It is to be expressly understood, however, that the drawings are for purposes of illustration only and not a definition of the limits of the invention, reference being had for this purpose to the appended claims.

In the drawings:

Figure 2 is a view similar to Figure 1 but showing another embodiment of the invention.

Figure 4 is a sectional view of the leading edge of the wing tip shown in Figure 1, taken on the line 4—4 thereof.

Figure 1:
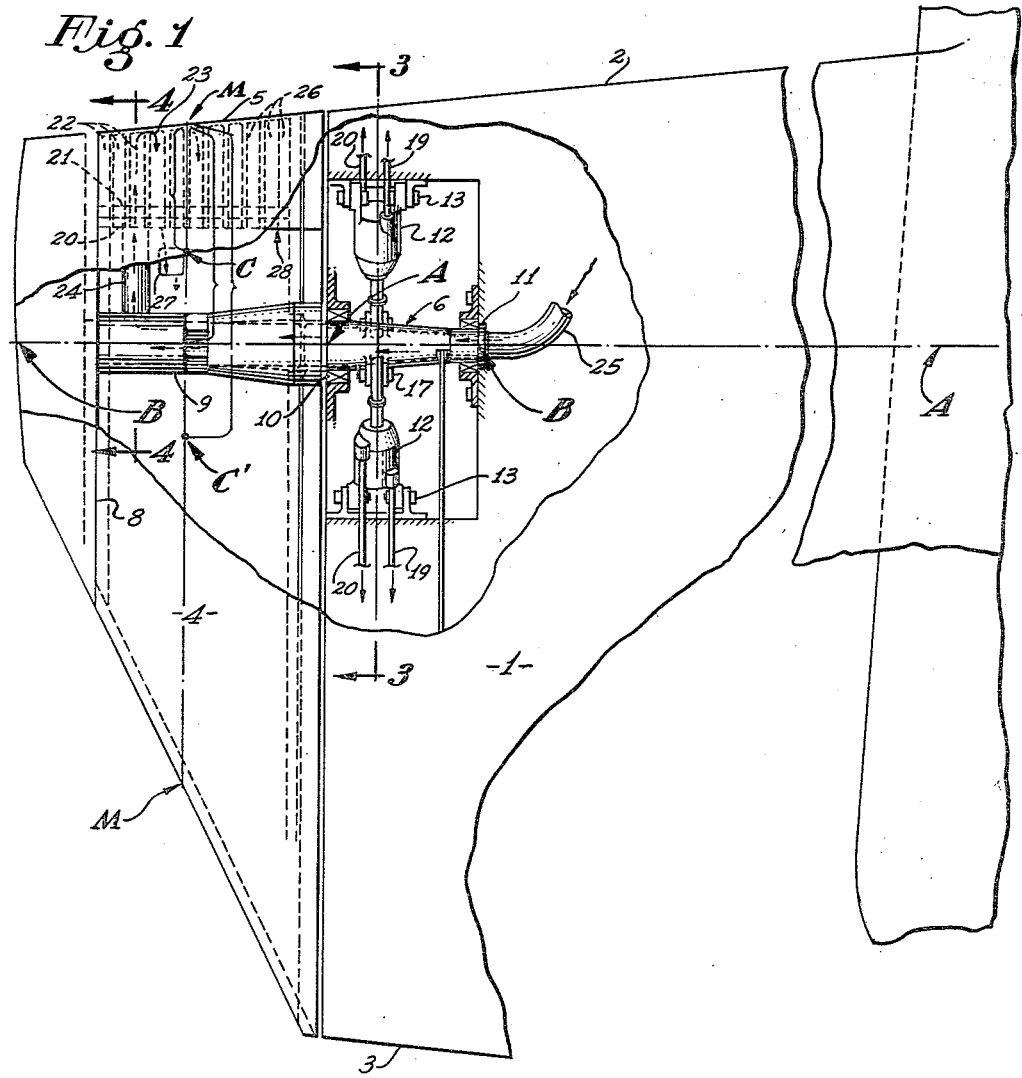
Figure 1 is a plan view of a cantilever type airplane wing having a rotatable wing tip in accordance with one embodiment of the present invention, the view being partly in section to better show the relation and construction of the wing and wing tip.
Figure 3:
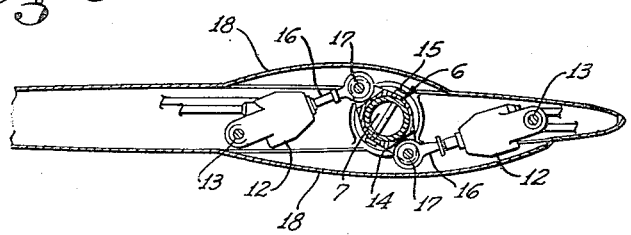
Figure 3 is a sectional view of the wing shown in Figure 1, taken on the line 3—3 thereof.

Referring to the drawings and particularly Figure 1 a cantilever wing 1 is shown, the wing having a leading edge 2, trailing edge 3, and a predetermined elastic axis indicated by the line A—A. Mounted adjacent the end of the wing is a rotatable wing tip 4 having the same general airfoil configuration as the wing at its outer end, the leading edge 5 of the wing tip being substantially in line with the leading edge of the wing and its aft portion being generally of a triangular configuration in planiform.

The wing tip is mounted for rotary movement about an axis B—B coinciding in part with the wing's elastic axis A—A and in part with the extension of the axis A—A. The wing tip is supported on a shaft 6 having a coaxial bore or passageway 7 extending throughout its length, the passageway being closed at its outer end by means of a web or rib 8 of the wing tip.

The outer end of the shaft 6 extends into the wing tip and is fixedly secured to chord members therein for rotation therewith, its inner end is rotatably journaled in spaced bearings 10 and 11 supported by structural members of the wing.

A pair of hydraulic actuators 12 are symmetrically mounted in opposing relationship on each side of the wing tip's supporting shaft 6 between the bearings 10 and 11, the actuators are adapted to provide an opposing force couple for imparting rotary movement to the wing tip or to resist aerodynamic forces acting thereon. The closed end of each actuator is pivotally mounted by means of hinge pins 13 which are supported by structural members of the wing, the pins being located at diametrically opposite positions with respect to the wing's elastic axis A—A. A double ended lever element 14 is fixedly secured to the shaft 6 by means of a bolt 15, the actuator piston rods 16 being pivotally attached to the lever element at diametrically opposite positions by means of hinge pins 17. A portion of the skin is removed from the upper and lower surface of the wing adjacent shaft 6 to provide operating space for lever element 14, piston rods 16, etc., suitable fairing 18 being provided to maintain the streamlined effect of the wing at this point. Conduits 19 and 20 constitute pressure and return lines for conducting a hydraulic fluid between the actuators 12 and a source of hydraulic fluid (not shown), the flow of hydraulic fluid to the actuators being regulated and controlled by conventional control means (not shown) suitably positioned in the pilot's compartment.

In the present embodiment definite locations have been assigned to the wing's elastic axis, the wing tip's axis of rotation, positions of the mean aerodynamic centers of pressure of the wing tip at subsonic and supersonic speeds, etc., however, it is to be understood these locations are illustrative only and will necessarily change for different airfoil sections. Referring to Figure 1 the elastic axis A—A of the wing is shown as being 25 percent of the chord from the wing's leading edge. The wing tip's mean aerodynamic chord is indicated by the line M—M. The axis of rotation of the wing tip B—B coincides with the elastic axis of the wing and its extension and intersects the mean aerodynamic chord M—M at the 35 percent point from the wing tip's leading edge. The mean subsonic center of pressure of the wing tip is indicated at C which is 20 percent of the mean aerodynamic chord M—M, the mean supersonic center of pressure C' of the wing tip is 50 percent of the mean aerodynamic chord M—M. Although the location of the centers of pressure C and C' will shift at different angles of attack of the wing tip this shift will be slight and may be disregarded. The above relationship of the locations of the subsonic and supersonic centers of pressure, with respect to the axis B—B, is due to the fact that the aft portion of the tip 5 is of triangular configuration in planiform. The aft outer end of the wing tip tapers inwardly from a point slightly aft of the axis B—B to the outer aft portion of the wing 1. Thus the surface area of the aft portion of the tip 4 shaped as shown in Figure 1, that is the surface area on which aerodynamic forces act, is considerably reduced over a wing tip having the same spanwise dimension throughout. Accordingly the subsonic center of pressure is located 15% chord length ahead of the axis B—B and the supersonic center of pressure a like distance (15% chord length) aft of the axis B—B.

Aerodynamic forces acting on the wing tip 4 may be considered as acting on the wing 1 for purposes of torsional deflection of the wing, in other words a resultant airforce acting on the wing tip at a given distance fore or aft of the wing's elastic axis is transmitted to the wing at a like distance fore or aft of the wing's elastic axis A—A. This will be the case regardless of the location of the wing tip's supporting shaft 6 with respect to the wing's elastic axis.

Assuming the resultant aerodynamic force acting on wing tip 4 to be equal at subsonic and supersonic speeds it becomes apparent the maximum torsional deflection of the wing will be equal and limited to a minimum amount with the wing and wing tip having the relationship as described above. The maximum deflection of the wing at either subsonic or supersonic speeds is limited to a minimum as the moment arm of the resultant air force is limited to 15 percent of the aerodynamic chord M—M. This would not be the case if the wing tip 4 was so designed that points C and C' did not occur at equal distances fore and aft of the extension of the wing's elastic axis A—A.

For example, assume the subsonic center of pressure C occurs at 10 percent (of chord M—M) forward of the extension of the wing's elastic axis and the supersonic center of pressure C' occurs at 20 percent (of chord M—M) aft of the extension of the wing's elastic axis A—A. In this example the moment arm of the resultant airforce acting through center of pressure point C' will exceed that shown in Figure 1 by 5 percent, accordingly the maximum torsional deflection of the wing in the above example will be greater than for the wing of Figure 1 at such times as the wing is subject to supersonic speeds.

Referring to Figure 1 it is seen the subsonic center of pressure C and supersonic center of pressure C' occurs at equal distances fore and aft of the axis B—B of the wing tip's supporting shaft 6. Thus the maximum torsional stress induced in the shaft 6 at either subsonic or supersonic speeds will be limited to a minimum as the moment arm of the resultant air force acting through either point C or C' will be 15 percent of the mean aerodynamic chord M—M. This would not be the case if the resultant air force acted through a greater moment arm as the wing tip is subject to either subsonic or supersonic speeds.

The actuators 12, symmetrically positioned on each side of the shaft 6, do not subject the shaft to a bending moment but rather provide a force couple which produces true rotational movement, accordingly the only load carried by the bearings 10 and 11 is the weight of the wing tip and aerodynamic forces acting on the tip which tend to subject the wing to a bending moment.

In the embodiment shown in Figure 2 the relationship existing between the axis of rotation B—B of the wing tip, the mean subsonic center of pressure C and the supersonic center of pressure C' are the same as disclosed and shown in connection with Figure 1. However the axis B—B of shaft 6 is laterally positioned, i. e., it extends at right angles to the longitudinal axis of symmetry of a plane to which the wing 1 is attached. In this embodiment the axis B—B of the supporting shaft intersects the elastic axis A—A of the wing at only one point, viz., at that point where aerodynamic forces acting on the wing tip are transferred to the wing. In this embodiment the exchange occurs at the outermost bearing 11, thus it is apparent the wing's torsional deflection at this point is limited to a minimum for the same reasons as explained in connection with the embodiment of Figure 1.

To de-ice the leading edge portion of the wing tip a corrugated metal sheet 28 is provided, the corrugated sheet having the same configuration as the inner surface of the wing tip's leading edge 5 and is secured thereto as by spot welding. The corrugated sheet 28 extends approximately 12 percent of the chord M—M to the rear of the tip's leading edge, the aft ends of sheet 28 terminate generally parallel with the wing tip's leading edge. A dividing wall 21, also generally parallel with the wing tip's leading edge, is positioned forward of the end portions 20 of the sheet 28 substantially as shown in Figures 1 and 4. The corrugated sheet 28, dividing wall 21, rib 8, and the innermost end portion of the wing tip define a plenum chamber 29 for hot de-icing gas. The crests 22 of the corrugated sheet extend parallel to the chord members of the wing tip and are provided with apertures 23 adjacent their forward portions. A conduit 24 extends between the shaft 6 and the dividing wall 21, the conduit being in fluid tight relationship between these two elements and provides a passageway therebetween as the shaft 6 is moved to various operational positions. A flexible conduit 25 communicates with bore 7 at the inner end of shaft 6 and a source of hot gas (not shown).

Thus it is seen a path for de-icing gas is provided via conduit 25, the bore 7 of shaft 6, conduit 24, the plenum chamber 29 apertures 23 and passageways 26 formed by the crests 22 and the skin of the wing tip. The de-icing gas is vented to the atmosphere by means of a port 27 located in the lower surface of the wing tip aft of the dividing wall 21. Hot gases flowing into the plenum chamber give up their heat to the leading edge of the wing tip at this point and also as they flow through passageways 26, thereby preventing or removing ice which may tend to form at this point.

While in order to comply with the statutes, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. In an airplane adapted to fly at subsonic and supersonic speeds, the combination comprising: a wing assembly including a wing having inboard and outboard ends and in which the inboard end is fixedly attached to said airplane; said wing having an elastic axis about which said wing torsionally deflects at such times as varying aerodynamic forces act on said wing; said wing assembly including a wing tip mounted on said wing at the outboard end thereof to provide a spanwise extension thereof; a shaft member fixedly secured to said wing tip and pivotally mounted in said wing; means mounted in said wing adapted to impart and arrest pivotal movement of said wing tip; the axis of said shaft member extending generally in the spanwise direction of said wing and coinciding at least at one point with said elastic axis within the confines of said wing; said wing tip being shaped in planiform to provide spaced predetermined centers of pressure located equal distances fore and aft of the axis of said shaft member at such times as said airplane is traveling at subsonic and supersonic speeds, respectively.

2. Apparatus as set forth in claim 1: further characterized in that said elastic axis and the axis of said shaft member coincide throughout a portion of their length.

3. Apparatus as set forth in claim 1: further characterized in that said shaft member is mounted in said wing in inboard and outboard bearings the latter bearing being located at the extreme outboard end of said wing and the elastic axis and the axis of said shaft member coinciding at a single point adjacent said outboard bearing.

4. In an airplane adapted to fly at subsonic and supersonic speeds, the combination comprising: a wing assembly including a wing having inboard and outboard ends and in which the inboard end is fixedly attached to said airplane; said wing having an elastic axis about which said wing torsionally deflects at such times as varying aerodynamic forces act on said wing; said wing assembly including a wing tip mounted on said wing at the outboard end thereof to provide a spanwise extension thereof; a shaft member fixedly secured to said wing tip and pivotally mounted in said wing; means mounted in said wing adapted to impart and arrest pivotal movement of said wing tip; the axis of said shaft member extending generally in the spanwise direction of said wing and coinciding at least at one point with said elastic axis within the confines of said wing; the aft portion of said wing tip being of triangular shape in planiform to provide spaced predetermined centers of pressure located equal distances fore and aft of the axis of said shaft member at such times as said airplane is traveling at subsonic and supersonic speeds, respectively.

5. Apparatus as set forth in claim 4: further characterized in that the outboard edge of said wing tip tapers inwardly from a point slightly aft of the axis of said shaft member to the aft outboard portion of said wing.

6. Apparatus as set forth in claim 5: further characterized in that said elastic axis and the axis of said shaft member coincide throughout a portion of their length.

7. Apparatus as set forth in claim 5: further characterized in that said shaft member is mounted in said wing in inboard and outboard bearings the latter bearing being located at the extreme outboard end of said wing and the elastic axis and the axis of said shaft member coinciding at a single point adjacent said outboard bearing.

References Cited in the file of this patent

UNITED STATES PATENTS

| Number | Name | Date |
| --- | --- | --- |
| 993,724 | Simmons | May 30, 1911 |
| 1,803,498 | Chilton | May 5, 1931 |
| 1,862,102 | Stout | June 7, 1932 |
| 1,890,012 | Alfaro | Dec. 6, 1932 |
| 2,142,699 | Riddle | Jan. 3, 1939 |
| 2,369,832 | Klose | Feb. 20, 1945 |
| 2,422,139 | Sheridan | June 10, 1947 |
| 2,556,736 | Palmatier | June 12, 1951 |